United States Patent Office 3,801,566
Patented Apr. 2, 1974

3,801,566
REMOVAL OF LACTAMS FROM A MEDIUM WHICH CONTAINS CONCENTRATED SULPHURIC ACID OR SULPHUR TRIOXIDE
Jan Elmendorp, Brunssum, and Abraham H. de Rooij, Geleen, Netherlands, assignors to Stamicarbon N.V., Heerlen, Netherlands
Filed June 15, 1971, Ser. No. 153,188
Claims priority, application Netherlands, June 17, 1970, 7008837
Int. Cl. C07d 41/06
U.S. Cl. 260—239.3 A                5 Claims

ABSTRACT OF THE DISCLOSURE

A process for recovering $\epsilon$-caprolactam from solutions of $\epsilon$-caprolactam and sulphuric acid and $SO_3$ is disclosed wherein ammonium dihydrogen phosphate or alkali metal dihydrogen phosphate is added to the lactam, sulphuric acid solution and the solution is then subjected to extraction by a substantially water immiscible solvent for the lactam whereby the lactam is extracted from the sulphuric acid solution and the lactam free sulphuric acid solution can be used to process rock phosphate to gypsum and phosphoric acid with the phosphoric acid being converted to ammonium or alkali metal dihydrogen phosphate to be used in treating further solutions of lactam and sulphuric acid.

FIELD OF THE INVENTION

The invention relates to the removal of lactams from a medium which contains concentrated sulphuric acid or sulphur trioxide. Lactams can be obtained by the rearrangement of alicyclic oximes. The rearrangement, commonly called the Beckman rearrangement, is preferably carried out with oleum or with sulphur trioxide.

The rearangement of cyclohexanone oxime to caprolactam is, as a rule, effected with oleum containing approximately 6 weight percent of free $SO_3$ at a temperature of about 125° C. Not only cyclohexanone oxime, but also other alicyclic oximes, such as cyclopentanone oxime, methylcyclohexanone oxime and cycloheptanone oxime, can be arranged to form lactams under the influence of a strongly acidic compound like oleum.

DESCRIPTION OF PRIOR ART

The preparation of lactams from compounds with a cycloalkyl nucleus containing a tertiary C-atom has also been proposed by treating such compounds with nitrous acid in concentrated sulphuric acid.

However, the lactam formed by either of the two above mentioned processes is a very weak, organic, nitrogenous base which is present in the reaction mixture in the conjugated acid form as lactam bisulphate. To remove the lactam from the acid reaction mixture, it is common practice to reduce the pH value of the mixture to approximately 4.5 with the addition of ammonia water. The lactam changes from a conjugated acid to a free base which separates, as a concentrated lactam solution in water, from the remaining ammonium sulphate solution. Upon the addition of ammonia, however, the sulphuric acid and sulphur trioxide used in the rearrangement react with the ammonia to form sulphate. For instance, about 1.8 tons of ammonia sulphate are obtained per ton of $\epsilon$-caprolactam produced when ammonia is added to the reaction mixture obtained from the Beckmann rearrangement of cyclohexanone oxime using oleum containing 6% by weight of free $SO_3$. The market is already oversupplied with ammonium sulphate and thus this by-product is undesirable.

It has been proposed (see, for instance, U.S. patent specification 2,737,511) to omit neutralizing the sulphuric acid or oleum after the oxime rearrangement to lactam has occurred, and to extract the lactam from the acid reaciton mixture, which has been diluted with water, with an organic solvent which is not water-miscible, for instance chloroform. An inorganic solvent such as liquid $SO_2$ has also been proposed for the extraction of the lactam. Such as scheme has the theoretical advantage in that the sulphuric solution freed from lactam can then be concentrated and reused in the oxime rearrangement reaction. In practice, however, when the sulphuric acid is recycled to the rearrangement process, the diluted acid left after extraction of the lactam must be concentrated, and further, by-products formed during rearrangement reaction accumulate in the recycling sulphuric acid. As a result of the accumulation of by-products, the recycled sulphuric acid is soon rendered unsuitable for production of a lactam of satisfactory quality.

It has also been proposed to add ammonium sulphate to the reaction mixture from the rearrangement reaction in such a quantity that ammonium bisulphate forms in the mixture with the separation of the lactam therefrom (see U.S. patent specification No. 3,336,298). The lactam is then extracted with an organic solvent such as benzene, leaving a concentrated solution of ammonium bisulphate which can be utilized in other processes, for instance, for the decomposition of rock phosphate. However, the acid properties of an ammonium bisulphate solution so produced are too weak to bring about decomposition of rock phosphate. The decomposition of the phosphate rock then has to be effected in combination with a stronger acid, for instance, nitric acid, or by first recovering free sulphuric acid from the ammonium bisulphate solution for use in the decomposition.

SUMMARY

The process according to the present invention provides a simple process for the removal of lactams from a sulphuric medium, combined with the decomposition of rock phosphate, in such a way that extra strong acid is not required for the decomposition of the rock phosphate and, also, no extraction need be applied to recover free sulphuric acid. According to the process of this invention, lactams are removed from a sulphuric acid medium, combined with the decomposition of rock phosphate in such a way that only ammonium dihydrogen phosphate or alkali metal dihydrogen phosphate is obtained as the phosphate-containing product.

It has now been found that addition of ammonium or alkali phosphates sufficiently decreases the degree of acidity of the lactam-sulphuric acid mixture to make extraction of the lactam possible, and also, in general, addition of salts of weak acids decreases the degree of acidity in sufficient measure to make extraction of lactam possible. In addition, if ammonium dihydrogen phosphate or alkali metal dihydrogen phosphate is added to the lactam-sulphuric acid mixture, the resulting mixture of sulphuric acid and ammonium dihydrogen phosphate or alkali metal dihydrogen phosphate which is present as a mixture of phosphoric acid, ammonium bisulphate, or alkali metal bisulphate and sulphuric acid or sulphate, can be utilized, after extraction of lactam, to process rock phosphate into ammonium dihydrogen phosphate or alkali metal dihydrogen phosphate. Such a process has the advantage that the solution resulting after the dissolution of the rock phosphate contains no substance which is foreign to the lactam extraction process. Thus, the solution of ammonium dihydrogen phosphate or alkali metal dihydrogen phosphate from the phosphate rock dissolution step can be returned to the lactam separation section to be utilized in freeing the lactam from the lactam bisulphate. The freed lactam can then be extracted from the strong acid medium.

To sufficiently weaken the lactam-sulphuric acid or the lactam-sulphur trioxide bond, whereby the lactam can then be extracted, at least about ¼ mole of ammonium dihydrogen phosphate or alkali metal dihydrogen phosphate to each mole of sulphuric acid or sulphur trioxide is added to the lactam sulphuric acid solution. The ammonium dihydrogen phosphate or alkali metal dihydrogen phosphate is added preferably in the form of an aqueous solution, for instance, of approximately 40–50% by weight. After extraction of the lactam, aqueous solutions with crystallization temperatures of from about 20°–30° C. will be obtained. The extraction proper can take place at these low temperatures, which has a favorable influence on the quality of the lactam, as, at this low temperature and with the short residence times in the extraction, the hydrolysis of lactam is virtually avoided.

The invention, therefore, comprises a process for the extraction of lactams from a concentrated sulphuric acid or sulphur trioxide containing medium by extraction with a solvent. The process is characterized in that the extraction of the lactam with the solvent takes place in the presence of a sufficient quantity of ammonium dihydrogen phosphate or alkali metal dihydrogen phosphate to free the lactam from the lactam bisulphate. The molar ratio between the dihydrogen phosphate and the sum of sulphuric acid and sulphur trioxide is at least ¼:1.

The solution containing free sulphuric acid and/or phosphoric acid which remains after extraction of lactam can be used for the decomposition of rock phosphate, with formation of phosphoric acid and gypsum. A solution of ammonium dihydrogen phosphate or of alkali metal dihydrogen phosphate can be obtained by removing the gypsum by filtration and neutralizing the free phosphoric acid with $NH_3$ or alkaline liquor. At least a portion of the ammonium dihydrogen phosphate or of alkali metal dihydrogen phosphate solution, which may still contain free phosphoric acid, can be returned to the lactam extraction step. The remainder of the solution can be recovered from which solid ammonium dihydrogen phosphate or alkali metal dihydrogen phosphate can be obtained by evaporation and crystallization.

The lactams can be extracted from the sulphuric, sulphur trioxide, mixture when the molar ratio between dihydrogen phosphate and sulphuric acid+sulphur trioxide is at least ¼:1. Excellent extraction efficiencies are achieved using a molar ratio of, for instance, 3:1. The molar ratio should not, for practical reasons, be greater than 2:1 if decomposition of rock phosphate using the acid solution which has been freed from lactam is contemplated, as rapid and complete decomposition of rock phosphate calls for a sufficiently low pH, which implies a certain molar ratio between ammonium dihydrogen phosphate and phosphoric acid, resulting from the conversion of part of the primary phosphate and sulphuric acid into phosphoric acid and ammonium sulphate.

The agents which can be used for extracting lactams from the reaction mixture are organic, water-immiscible solvents such as benzene, cyclohexane, heptane, halogenated hydrocarbons, nitro-hydrocarbons, ethers, dioxane and nitriles. Inorganic solvents such as liquid sulphur dioxide can also be used. Chloroform and 1,1,2,2-tetrachloroethane are preferred extraction agents because of their high extraction efficiency.

DRAWINGS

DESCRIPTION OF PREFERRED EMBODIMENTS

The extraction efficiency referred to above is defined as the percentage of lactam extracted from the lactam containing mixture by the extraction agent in one extraction stage. The extraction efficiency is dependent on the extraction agent and the quantity thereof, on the molar ratio between the dihydrogen phosphate and sulphuric acid sulphur trioxide present in the lactam synthesis mixture, and on the water content. In the range of 10–40° C. the influence of temperature is negligible.

Figure 1:
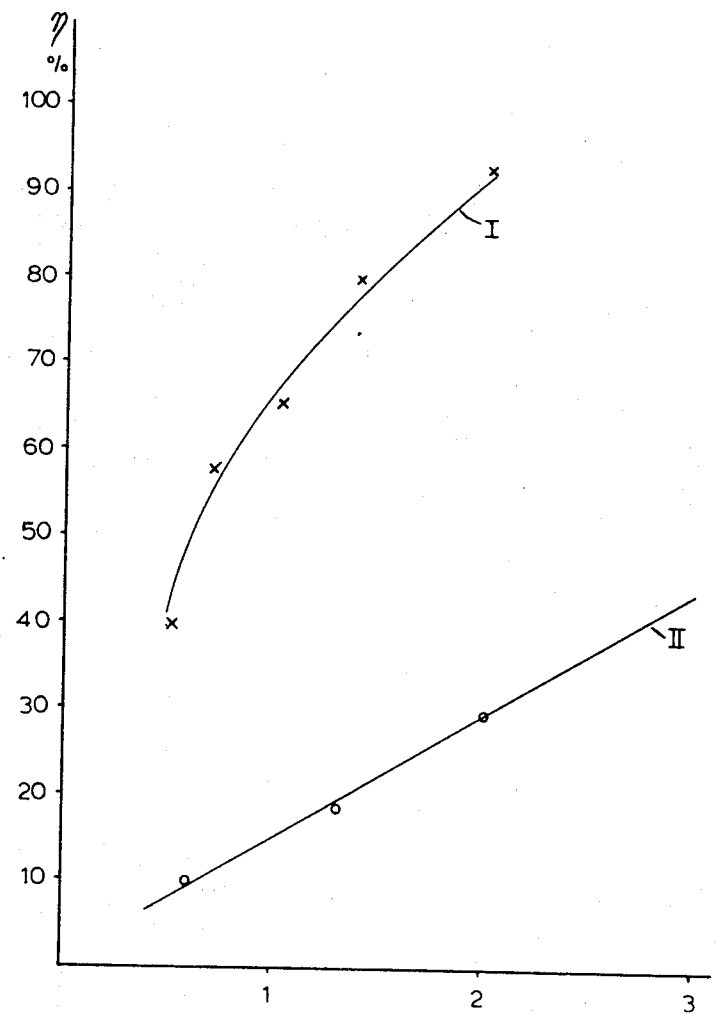
FIGS. 1 and 2 are graphs of extraction efficiency ($\eta$) as a function of the molar ratio of ammonium dihydrogen phosphate and sulphuric acid in the extraction mixture and the quantity of water in the extraction mixture respectively.

In FIG. 1, the extraction efficiency ($\eta$) of chloroform and benzene in percent are plotted on the ordinate and the molar ratio between the ammonium dihydrogen phosphate and the sulphuric acid in the lactam synthesis mixture on the abscissa. The lactam synthesis mixture contained 150 moles of sulphuric acid to each 100 moles of $\epsilon$-caprolactam. Each extraction was carried out with such a quantity of extraction agent that a quantitative extraction of a lactam solution consisting of 9 parts by weight of solvent to 1 part by weight of lactam was obtained. Curve I relates to chloroform and curve II to benzene.

Figure 2:
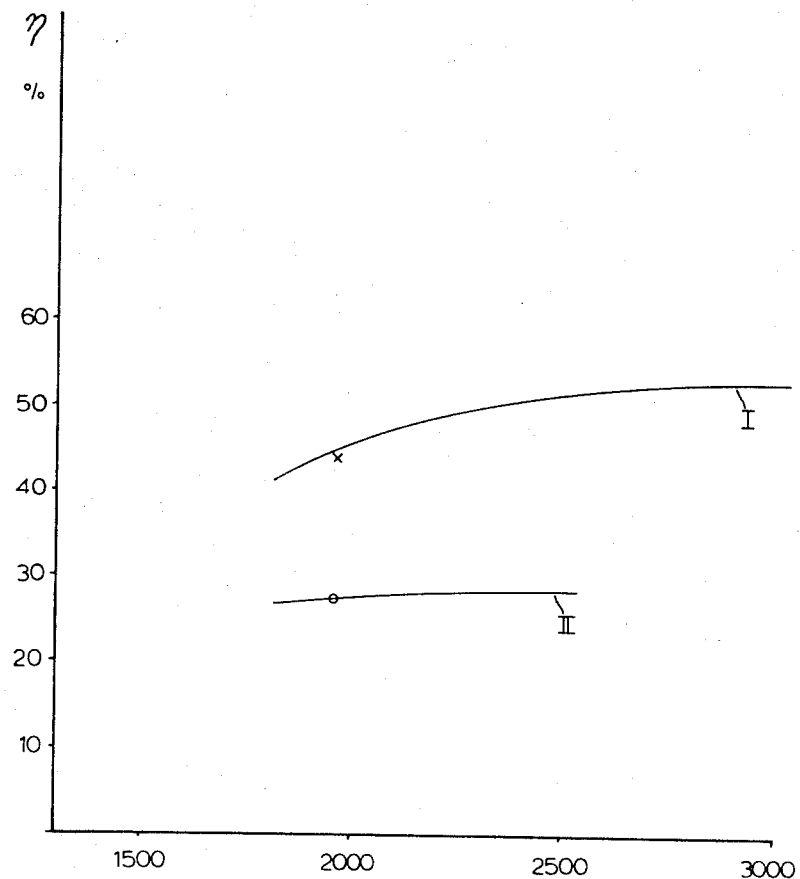

In FIG. 2, the extraction efficiency is plotted on the ordinate, with the water quantity, in moles, on the abscissa. Curve I relates to the extraction of the lactam synthesis mixture with chloroform, in which the lactam mixture contained besides water, 110 moles of $H_3PO_4$ and 190 moles of $NH_4H_2PO_4$ to each 100 moles of lactam and 150 moles of $H_2SO_4$. Curve II relates to the extraction of a lactam containing mixture with benzene, in which the lactam mixture contains, besides water, 300 moles of $NH_4H_2PO_4$ to each 100 moles of lactam and 150 moles of $H_2SO_4$. Here, again, the extractions were invariably carried out with such a quantity of extraction agent that a lactam solution consisting of 9 parts by weight of extraction agent to 1 part by weight of lactam was obtained.

The graphs show that the influence of the water quantity on the extraction efficiency is relatively small in comparison with that of the molar ratio.

To prevent possible hydrolysis of the lactams, for instance, $\epsilon$-lactam to $\epsilon$-aminocaproic acid during the extraction of the lactam from the acid arrangement mixture, the temperature in the extraction process should be maintained relatively low, i.e. the temperature should not be allowed to exceed 40° C. and extraction is preferably effected at a temperature below 30° C.

One preferred mode of performing the process according to the invention comprises the extraction of lactam with a solvent in the presence of a solution which contains ammonium dihydrogen phosphate or alkali dihydrogen phosphate, combined with the decomposition of rock phosphate with the sulphuric solution remaining after the extraction of lactam. This sulphuric solution can be used directly for the decomposition of rock phosphate. However, this involves, simultaneously with the decomposition, precipitation of gypsum, in which particles of rock phosphate may become entrapped by the gypsum without being decomposed. A preferred method of decomposing the rock phosphate having an improved decomposition efficiency utilizes the sulphuric solution indirectly for the decomposition by first dissolving the rock phosphate with a phosphoric acid solution and then precipitating gypsum by the addition of the lactam free sulphuric acid solution to the dissolved rock phosphate-phosphoric acid solution with formation of free phosphoric acid. The regenerated phosphoric acid is reused to dissolve more rock phosphate, phosphoric acid-containing solution.

Figure 3:
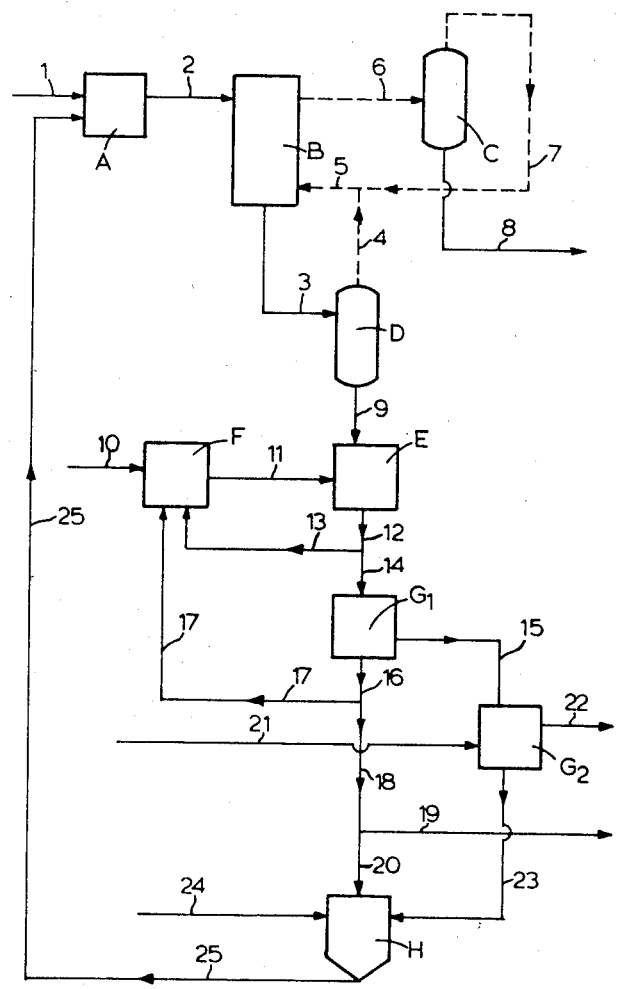
FIG. 3 is a schematic diagram of one perfered mode of operation of the present invention.

A preferred mode of performing the process according to the invention, in which rock phosphate is decomposed in an indirect manner with the free sulphuric acid-containing solution remaining after the extraction of lactam from the lactam synthesis mixture is shown schematically in FIG. 3, wherein a mixing vessel, A, is supplied via line 1 with a lactam-sulphuric acid mixture obtained from the Beckmann rearrangement of an oxime to the lactam. A solution of ammonium dihydrogen phosphate or of alkali metal dihydrogen phosphate is supplied to vessel A through line 25.

The mixture from vessel A flows into an extractor B through line 2. The lactam extraction agent is supplied via line 5 to the extractor B. The lactam laden extraction agent flows via line 6 from the extractor B into the evaporator C. The extraction agent is evaporated leaving the lactam behind. The evaporated extraction agent vapors are condensed, and recirculated via line 7 to the extractor B. The recovered lactam leaves the system through line 8.

The aqueous solution remaining after the lactams have been extracted, comprising sulphuric acid, ammonium dihydrogen phosphate or alkali dihydrogen phosphate and traces of extraction agent, is withdrawn from extractor B, via line 3 and introduced into a stripping column D. The traces of extraction agent contained in this solution are stripped from the aqueous acid solution and recirculated to the extraction system through line 4.

Rock phosphate is introduced through line 10 to decomposition reactor F. The rock phosphate is decomposed with phosphoric acid containing solutions delivered to reactor F by the lines 13 and 17. The resulting decomposition liquid containing the dissolved rock phosphate is led via line 11 into a gypsum precipitation vessel E. The sulphuric acid-containing solution discharged from the stripping column is fed to vessel E via line 9 and reacts with the rock phosphate solution to precipitate gypsum and generate phosphoric acid.

The aqueous phosphoric acid suspension of gypsum formed in vessel E flows via line 12 and 14 to separate $G_1$ which is a solid-liquid separating device, for instance, a filtering device or a decanting device. Gypsum is separated from the aqueous phosphoric acid solution in separator $G_1$. A portion of the aqueous phosphoric acid suspension of gypsum from vessel E is recirculated by line 13 to reactor F.

Gypsum-free phosphoric acid solution is discharged from separator $G_1$ via line 16. A portion of the gypsum-free phosphoric acid solution is recirculated via line 17 to the decomposition reactor F, while the remaining portion is forwarded by line 18 to lines 19 and 20. The phosphoric acid solution in line 18 is divided into a portion which is withdrawn as phosphoric acid product through line 19 and a second portion which introduced through line 20 to neutralization vessel H. The phosphoric acid solution fed to vessel H is neutralized with $NH_3$ or an alkaline liquor supplied to vessel H through line 24. The ammonium dihydrogen phosphate or alkali metal dihydrogen phosphate produced in neutralization vessel H is recirculated through line 25 to mixing vessel A.

The gypsum solids obtained in separator $G_1$ are washed in the washing tank $G_2$ which can be simply a separate chamber incorporated into separate $G_1$. The gypsum is worked with water supplied via line 21. Gypsum crystals are discharged from the system via line 22, while the wash water and any mother liquor remaining in the gypsum crystals coming from separator $G_1$ are introduced into the neutralization vessel H via line 23.

This mode of operation can be modified in various ways without departing from the invention. The invention comprises the extraction of the lactam from the reaction mixture obtained in the Beckmann rearrangement of an oxime to form a lactam. The extraction of the lactam being accomplished in the presence of a solution of ammonium dihydrogen phosphate or of alkali metal dihydrogen phosphate. The sulphuric solution obtained from such extraction being then utilized in the decomposition of rock phosphate to produce ammonium dihydrogen phosphate or alkali metal dihydrogen phosphate which is recycled to the lactam extraction step. The neutralization vessel H shown in FIG. 3 could be deleted and with the ammonia or alkaline liquor required for the neutralization of the phosphoric acid solution to dihydrogen phosphate could be fed directly to the mixing vessel A, along with the phosphoric acid solution. Also, the wash water discharged via line 23 could be added to the solution flowing through line 18. However, the wash water is preferably used for dilution of the solution to be recirculated via line 25. This solution must have a relatively low point of crystallization in order to avoid hydrolysis of lactam. The quantities of the solutions which contain free acid and are returned to the decomposition reactor F, can be varied within wide limits. These quantities do not only depend on the quantity of rock phosphate to be decomposed, but also on the gypsum concentration by preference, the gypsum-free flow to be recirculated via line 18 will be chosen such that the gypsum concentration in the gypsum-precipitation vessel E will not exceed 30% by weight. The quantities to be recirculated via the lines 13 and 18 should, together, contain such a quantity of free acid as suffices to dissolve the amount of rock phosphate supplied to the decomposition reactor F via line 10.

The following example utilizing the process scheme shown in FIG. 3 demonstrates one particular mode of operation of the present process. The quantities of the substances are expressed in moles and the process steps were carried out in batch.

EXAMPLE

A mixture of lactam and sulphuric acid, with a composition of 100 moles of $\epsilon$-caprolactam to 150 moles of sulphuric acid, such as produced in the Beckmann rearrangement of cyclohexanone is subjected to the separation process of the present invention.

The $\epsilon$-caprolactam, sulphuric acid mixture was mixed together with an ammonium dihydrogen phosphate containing solution, containing 150 moles of $NH_4H_2PO_4$ and 1378 moles of $H_2O$ in vessel A at a temperature of 20° C. The mixed solution from vessel A was subjected to an extraction in extractor B using chloroform as the extraction agent. The chloroform phase containing the extracted lactam was then separated from the aqueous sulphuric acid solution by separating the chloroform phase from the aqueous phase. The temperature of the solutions during the extraction step was maintained at 20° C. The lactam was recovered by first distilling part of the chloroform from the lactam at a temperature of 115° C., and then extracting a 60% by weight solution of lactam in chloroform with water at a temperature of 35° C.

The aqueous sulphuric acid solution obtained after the chloroform phase containing lactam was separated therefrom, was introduced into gypsum precipitator E. Also introduced into precipitator E was an aqueous solution containing phosphoric acid and dissolved phosphate rock from reactor F. The aqueous solution of dissolved phosphate rock contained roughly 1072 moles $CaSO_4$, 150 moles $Ca(H_2PO_4)_2$, 581 moles $H_3PO_4$, 1481 moles $NH_4H_2PO_4$ and 13,096 moles $H_2O$. This solution was obtained by dissolving rock phosphate comprising roughly 150 moles CaO and 40.5 moles $P_2O_5$ in an aqueous solution comprising 1072 moles $CaSO_4$, 800 moles $H_3PO_4$, 1481 moles $NH_4H_2PO_4$ and 13,068 moles $H_2O$. The sulphuric acid solution was mixed with the aqueous solution of phosphate rock thereby precipitating gypsum and generating phosphoric acid. The mixture was maintained at a temperature of 65° C. during the precipitation step.

A gypsum slurry comprising 1222 moles $CaSO_4$, 150 moles $Ca(H_2PO_4)_2$, 581 moles $H_3PO_4$, 1481 moles $$NH_4H_2PO_4$$

and 13,096 moles of water was obtained.

A portion of the gypsum slurry obtained in the gypsum precipitator E amounting to 1431 moles $NH_4H_2PO_4$, 12,698 moles $H_2O$, 1072 moles $CaSO_4$ and 773 moles $H_3PO_4$ were recycled to reactor F to be used in dissolving more phosphate rock. The remaining gypsum slurry amounting to 150 moles $CaSO_4$, 108 moles $H_3PO_4$, 200 moles $NH_4H_2PO_4$ and 1776 moles $H_2O$ was introduced to gypsum separtor $G_1$ wherein 150 moles gypsum, 31 moles $H_3PO_4$ and 722 moles water were separated from the aqueous phosphoric acid medium. The aqueous phosphoric acid remaining after the removal of the gypsum amounted to roughly 77 moles $H_3PO_4$, 143 moles $$NH_4H_2PO_4$$

and 1054 moles $H_2O$. A portion of this aqueous phosphoric acid solution amounting to 27 moles $H_3PO_4$, 50 moles $NH_4H_2PO_4$ and 370 moles $H_2O$ was recirculated to reactor F to be used in dissolving more phosphate rock. A second portion of the aqueous phosphoric acid solution comprising roughly 22 moles $H_3PO_4$, 40 moles $$NH_4H_2PO_4$$

and 296 moles $H_2O$ were introduced to vessel H and the third portion of the aqueous phosphoric acid comprising roughly 28.4 moles $H_3PO_4$, 52.6 moles $NH_4H_2PO_4$ and 388 moles water was withdrawn from the process. Approximately 52.6 moles of $NH_3$ were added to the phosphoric acid solution in vessel H producing an aqueous solution comprising 150 moles $NH_4H_2PO_4$ and 1378 moles $H_2O$. This solution was recycled to mixing vessel A to aid in extraction of more lactam from further reaction product from the Beckmann rearrangement of cyclohexanone.

The pressures at which the various steps of the present process are not critical. Atmospheric, subatmospheric or elevated pressures can be used. Temperatures of the solutions in the various steps of the invention are generally not critical. As mentioned hereinbefore, the extraction of the lactam should not be accomplished at temperatures above about 40° C.

What is claimed is:

1. A process for recovering ε-caprolactam from a mixture of said lactam in concentrated sulphuric acid or concentrated sulphuric acid and free $SO_3$ wherein the lactam is bound to the sulphuric acid as lactam bisulphate, said process comprising
   (1) adding to the said lactam mixture a member selected from the group consisting of
      ammonium dihydrogen phosphate, an alkali metal dihydrogen phosphate, a mixture of ammonium dihydrogen phosphate and free phosphoric acid, and a mixture of an alkali metal dihydrogen phosphate and free phosphoric acid, in an amount that the molar ratio of the ammonium dihydrogen phosphate or the alkali metal dihydrogen phosphate to the sum of sulphuric acid and free $SO_3$ in said lactam mixture is at least ¼:1,
   whereby the bond between the lactam and sulphuric acid is significantly weakened,
   (2) adding a substantially water-immiscible, solvent for said lactam to the solution obtained in step (1), whereby a two-phase mixture is obtained consisting of a solvent phase and an aqueous sulphuric acid phase,
   (3) extracting the mixture obtained in step (2) whereby the weakly bonded lactam is extracted from the sulphuric acid phase by said solvent,
   (4) separating the solvent phase containing the extracted lactam from the aqueous sulphuric acid phase and removing the ε-caprolactam,
   (5) mixing the sulphuric acid phase
      comprising sulphuric acid, water, ammonium dihydrogen phosphate or alkali metal dihydrogen phosphate remaining after the separation of the solvent phase in step (4)
   with rock phosphate, thereby decomposing the rock phosphate and dissolving the rock phosphate in the sulphuric acid phase of step (4) with the resulting formation of a slurry containing gypsum and a solution of free phosphoric acid, and
   (6) separating the gypsum slurry of step (5) from the free phosphoric acid solution.

2. A process as claimed in claim 1 wherein
   (7) at least a portion of the free phosphoric acid solution obtained after the gypsum has been removed in step (6) is treated with ammonia or an alkaline liquor converting the free phosphoric acid to ammonium dihydrogen phosphate or alkali metal dihydrogen phosphate, and
   (8) recirculating and adding the solution obtained in step (7) to the lactam-sulphuric acid solution in step (1).

3. A process as claimed in claim 1 wherein the molar ratio in step (1) of ammonium dihydrogen phosphate or alkali metal dihydrogen phosphate to the sum of sulphuric acid and free $SO_3$ in the mixture to be extracted is between ¼:1 and 2:1.

4. A process as claimed in claim 1 wherein extraction step (3) is carried out at a temperature of less than 40° C.

5. A continuous process for recovering ε-caprolactam from a mixture of said lactam in concentrated sulphuric acid or concentrated sulphuric acid and free $SO_3$ wherein the lactam is bound to the sulphuric acid as lactam bisulphate, said process comprising
   (1) adding to the said lactam mixture a member selected from the group consisting of
      ammonium dihydrogen phosphate, an alkali metal dihydrogen phosphate, a mixture of ammonium dihydrogen phosphate and free phosphoric acid, and a mixture of an alkali metal dihydrogen phosphate and free phosphoric acid, in an amount that the molar ratio of the ammonium dihydrogen phosphate or the alkali metal dihydrogen phosphate to the sum of sulphuric acid and free $SO_3$ in said lactam mixture is at least ¼:1,
   whereby the bond between the lactam and sulphuric acid is significantly weakened,
   (2) adding a substantially water-immiscible, solvent for said lactam to the solution obtained in step (1), whereby a two-phase mixture is obtained consisting of a solvent phase and an aqueous sulphuric acid phase,
   (3) extracting the mixture obtained in step (2) whereby the weakly bonded lactam is extracted from the sulphuric acid phase by said solvent,
   (4) separating the solvent phase containing the extracted lactam from the aqueous sulphuric acid phase and removing the ε-caprolactam,
   (5) mixing the sulphuric acid phase
      comprising sulphuric acid, water, ammonium dihydrogen phosphate or alkali metal dihydrogen phosphate remaining after the separation of the solvent phase in step (4)
   with rock phosphate, thereby decomposing the rock phosphate and dissolving the rock phosphate in the sulphuric acid phase of step (4) with the resulting formation of a slurry containing gypsum and a solution of free phosphoric acid,
   (6) separating the gypsum slurry of step (5) from the free phosphoric acid solution,
   (7) treating at least a portion of the free phosphoric acid solution, after the gypsum has been removed in step (6), with ammonia or an alkaline liquor converting the free phosphoric acid to ammonium dihydrogen phosphate or an alkali metal dihydrogen phosphate, and (8) recirculating and adding the solution obtained in step (7) to the lactam-sulphuric acid solution in step (1).

References Cited

UNITED STATES PATENTS

| | | | |
|---|---|---|---|
| 2,579,851 | 12/1951 | Novotny | 260—239.3 A |
| 2,737,511 | 3/1956 | Cohn | 260—239.3 A |
| 3,336,298 | 8/1967 | De Rooij | 260—239.3 A |
| 3,429,920 | 2/1969 | De Rooij | 260—705 |

FOREIGN PATENTS

| | | | |
|---|---|---|---|
| 1,916,149 | 10/1969 | Germany | 260—239.3 A |
| 881,646 | 4/1943 | France | 260—239.3 A |

HENRY R. JILES, Primary Examiner

R. T. BOND, Assistant Examiner

U.S. Cl. X.R.

260—705; 423—308,309, 319, 320, 312, 313